United States Patent
Hapgood et al.

(10) Patent No.: US 10,762,462 B1
(45) Date of Patent: Sep. 1, 2020

(54) SENSOR-BASED CUSTOMER ARRIVAL DETECTION

(71) Applicant: Amazon Technologies, Inc., Seattle, WA (US)

(72) Inventors: Ryan Hapgood, Belmont (AU);
Alexander Edwards, Brisbane (AU);
Uladzimir Silchanka, Boondall (AU);
Lev Zelenskiy, South Brisbane (AU);
James Lance Eather, Kelvin Grove (AU); Sheng-Wei Lin, Carindale (AU);
Jon R. Ducrou, West End (AU);
Michael John Neville, Bunya (AU)

(73) Assignee: Amazon Technologies, Inc., Seattle, WA (US)

( * ) Notice: Subject to any disclaimer, the term of this patent is extended or adjusted under 35 U.S.C. 154(b) by 241 days.

(21) Appl. No.: 16/057,430

(22) Filed: Aug. 7, 2018

(51) Int. Cl.
*G06Q 10/06* (2012.01)
*G01C 21/12* (2006.01)

(52) U.S. Cl.
CPC ....... *G06Q 10/06393* (2013.01); *G01C 21/12* (2013.01)

(58) Field of Classification Search
CPC .......................................... G06Q 10/00–50/00
USPC ................................................ 705/7.11–7.42
See application file for complete search history.

(56) References Cited

U.S. PATENT DOCUMENTS

| | | | | | |
|---|---|---|---|---|---|
| 4,360,875 | A | * | 11/1982 | Behnke | G01C 21/00 379/93.02 |
| 5,559,707 | A | * | 9/1996 | DeLorme | G01C 21/20 340/990 |
| 6,026,375 | A | * | 2/2000 | Hall | G06Q 10/08 701/533 |
| 6,253,148 | B1 | * | 6/2001 | Decaux | G08G 1/123 246/5 |
| 6,424,910 | B1 | * | 7/2002 | Ohler | G01C 21/3438 340/988 |

(Continued)

FOREIGN PATENT DOCUMENTS

EP    2689391 A2 *  1/2014  ......... G06Q 10/0834

OTHER PUBLICATIONS

Bulut, Muhammed Fatih, Murat Demirbas, and Hakan Ferhatosmanoglu. "Lineking: Coffee shop wait-time monitoring using smartphones." IEEE Transactions on Mobile Computing 14.10 (2014): 2045-2058. (Year: 2014).*

*Primary Examiner* — Alan S Miller
(74) *Attorney, Agent, or Firm* — Lee & Hayes, P.C.

(57) ABSTRACT

Upon receiving an indication that a customer is initiating travel to a merchant location to pick up one or more items, sensor data may be obtained by, and received from, a customer device of the customer. After the customer has arrived at the merchant location, the customer may be greeted or otherwise interacted with and a corresponding interaction time may be determined. The service provider may identify one or more stop events based on the sensor data, where a stop event indicates that a customer stopped while in transit to the merchant location. A most recent stop event prior to the interaction time may constitute the customer arriving/stopping at the merchant location, and a corresponding arrival time may be estimated. A wait time of the customer may be determined based on a difference between the interaction time and the arrival time.

20 Claims, 6 Drawing Sheets

(56) References Cited

U.S. PATENT DOCUMENTS

| | | | |
|---|---|---|---|
| 6,975,997 B1* | 12/2005 | Murakami | B60L 53/65 705/5 |
| 7,027,995 B2* | 4/2006 | Kaufman | G06Q 10/109 705/7.12 |
| 7,080,019 B1* | 7/2006 | Hurzeler | G06Q 10/025 705/6 |
| 7,082,364 B2* | 7/2006 | Adamczyk | G01C 21/3438 701/485 |
| 7,136,747 B2* | 11/2006 | Raney | G01C 21/20 701/465 |
| 7,212,975 B2* | 5/2007 | Bantz | G06Q 10/063 705/26.4 |
| 7,353,034 B2* | 4/2008 | Haney | H04W 4/14 455/457 |
| 7,856,300 B2* | 12/2010 | Hozumi | B60N 2/99 701/49 |
| 8,090,707 B1* | 1/2012 | Orttung | G06Q 10/109 707/710 |
| 8,140,256 B1* | 3/2012 | dos-Santos | G06Q 10/025 701/117 |
| 8,145,417 B1* | 3/2012 | Chitre | G01C 21/362 701/517 |
| 8,150,608 B2* | 4/2012 | Cobbold | G06Q 10/10 701/117 |
| 8,285,570 B2* | 10/2012 | Meyer | G06Q 50/14 705/5 |
| 8,340,890 B1* | 12/2012 | Cobbold | G06Q 10/10 701/117 |
| 9,406,084 B2* | 8/2016 | Havas | G06Q 30/0633 |
| 9,507,346 B1* | 11/2016 | Levinson | B60W 30/0956 |
| 10,453,025 B2* | 10/2019 | Agasti | G06Q 10/0836 |
| 10,460,411 B2* | 10/2019 | Liu | H04L 67/18 |
| 10,467,579 B1* | 11/2019 | Reiss | G06Q 10/0833 |
| 10,467,581 B2* | 11/2019 | Laury | G06Q 10/0833 |
| 2001/0056363 A1* | 12/2001 | Gantz | G06Q 99/00 705/500 |
| 2002/0062192 A1* | 5/2002 | Saraga | G06F 16/9537 701/465 |
| 2002/0188492 A1* | 12/2002 | Borton | G06Q 30/0202 705/7.13 |
| 2003/0100993 A1* | 5/2003 | Kirshenbaum | G01C 21/26 701/408 |
| 2003/0109266 A1* | 6/2003 | Rafiah | G01C 21/3423 455/456.1 |
| 2003/0177020 A1* | 9/2003 | Okamura | G06Q 10/08 705/5 |
| 2003/0177072 A1* | 9/2003 | Bared | G06Q 30/0635 705/26.81 |
| 2004/0049424 A1* | 3/2004 | Murray | G06Q 30/0226 705/14.14 |
| 2004/0177008 A1* | 9/2004 | Yang | G06Q 10/08 705/26.1 |
| 2004/0210621 A1* | 10/2004 | Antonellis | G06Q 10/087 709/200 |
| 2005/0033614 A1* | 2/2005 | Lettovsky | G06Q 10/025 705/5 |
| 2006/0022048 A1* | 2/2006 | Johnson | H04L 67/18 235/462.1 |
| 2006/0076397 A1* | 4/2006 | Langos | G06Q 10/087 235/375 |
| 2006/0155460 A1* | 7/2006 | Raney | G01C 21/20 701/468 |
| 2006/0276960 A1* | 12/2006 | Adamczyk | G06Q 10/06 701/516 |
| 2007/0088624 A1* | 4/2007 | Vaughn | G06Q 50/12 705/15 |
| 2007/0106468 A1* | 5/2007 | Eichenbaum | G06Q 30/02 701/431 |
| 2008/0054072 A1* | 3/2008 | Katragadda | G08G 1/123 235/384 |
| 2008/0082424 A1* | 4/2008 | Walton | G06Q 30/02 705/26.1 |
| 2008/0091342 A1* | 4/2008 | Assael | G01C 21/3438 701/533 |
| 2008/0319653 A1* | 12/2008 | Moshfeghi | G01C 21/3608 701/532 |
| 2009/0006194 A1* | 1/2009 | Sridharan | G06Q 30/0273 705/14.62 |
| 2009/0048878 A1* | 2/2009 | Metcalf | G06Q 30/02 705/5 |
| 2009/0187488 A1* | 7/2009 | Shamilian | G06Q 20/3224 705/16 |
| 2010/0121662 A1* | 5/2010 | Becker | G06Q 10/02 705/5 |
| 2010/0274569 A1* | 10/2010 | Reudink | H04W 4/02 705/1.1 |
| 2011/0238474 A1* | 9/2011 | Carr | G06Q 30/0259 705/14.23 |
| 2012/0191551 A1* | 7/2012 | Lutnick | G06Q 20/20 705/15 |
| 2012/0232776 A1* | 9/2012 | Gontmakher | G06Q 10/047 701/117 |
| 2012/0239289 A1* | 9/2012 | Gontmakher | G01C 21/3438 701/420 |
| 2012/0290652 A1* | 11/2012 | Boskovic | G06Q 50/30 709/204 |
| 2012/0296885 A1* | 11/2012 | Gontmakher | G06Q 10/047 707/705 |
| 2013/0041941 A1* | 2/2013 | Tomasic | G08G 1/123 709/203 |
| 2013/0317921 A1* | 11/2013 | Havas | G06Q 30/0641 705/15 |
| 2014/0074743 A1* | 3/2014 | Rademaker | G06Q 10/083 705/334 |
| 2014/0279270 A1* | 9/2014 | Bertanzetti | G06Q 30/0635 705/26.81 |
| 2015/0161697 A1* | 6/2015 | Jones | G06Q 30/0611 705/26.4 |
| 2015/0356502 A1* | 12/2015 | Agasti | H04W 4/12 705/339 |
| 2016/0155088 A1* | 6/2016 | Pylappan | G06Q 10/0836 705/333 |
| 2016/0247113 A1* | 8/2016 | Rademaker | G06Q 10/063114 |
| 2016/0292664 A1* | 10/2016 | Gilfoyle | H04W 4/027 |
| 2018/0060990 A1* | 3/2018 | Liu | H04L 67/16 |
| 2019/0228375 A1* | 7/2019 | Laury | G05D 1/0088 |

* cited by examiner

SENSOR-BASED CUSTOMER ARRIVAL DETECTION

BACKGROUND

Consumers are increasingly ordering items in an online environment, such as via a website or a mobile application. Instead of requesting that the ordered items be delivered to a physical location associated with a customer (e.g., a personal residence, a workplace, etc.), the customer may opt to pick up the ordered items from a physical location of a merchant (e.g., a grocery store). In order to facilitate a positive customer experience, the merchant may desire to minimize the amount of time that the customer waits once he/she arrives at the physical location of the merchant. Although the merchant may be aware of the time that the customer is greeted by an individual at the physical location of the merchant, it is difficult to determine when the customer actually arrived to pick up his/her items, and how long the customer was waiting before they were greeted. Extended wait times may cause customers to order and pick up the ordered items elsewhere.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
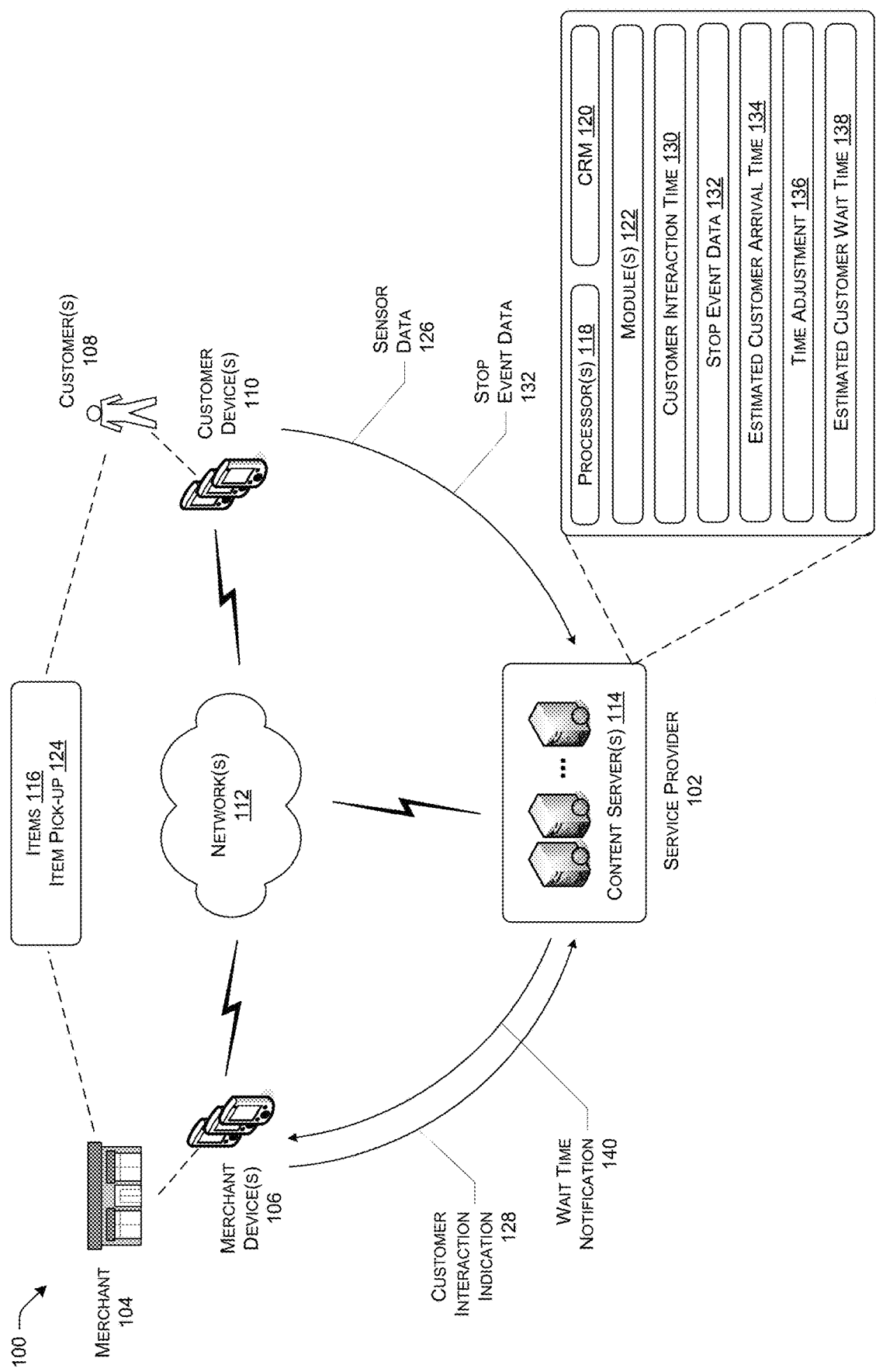
FIG. 1 illustrates an example system for estimating a wait time of a customer at a merchant location based on sensor data obtained by a customer device of the customer.

Described herein are systems and/or processes for estimating a wait time of a customer at a merchant location based on sensor data obtained by a customer device while the customer is in transit to the merchant location. In various embodiments, a service provider may receive orders for items (e.g., food items) that are fulfilled by merchants (e.g., a grocery store merchant). Although the items may be delivered to customers that place the orders for the items, the customers may also have the option to pick up the items at a merchant location of the merchant (e.g., a physical grocery store or pick-up location). The service provider may identify a time slot/period for the customer to pick up the ordered items, or the customer may be provided with options to select a particular time slot/period for pick-up. Ordering of the items and/or the selection or assignment of the time slot/period may be performed using a mobile application or website that is associated the service provider and that is accessible via customer devices of customers.

Provided that a customer is to pick up items at a particular merchant location, the service provider may receive sensor data from a customer device (e.g., a mobile telephone, a tablet device, etc.) of the customer while the customer is in transit to the merchant location. The sensor data may include location data (e.g., GPS data obtained by a location sensor of the customer device) or data regarding movement of the customer device, such as velocity data, acceleration data, etc., which may be obtained by a motion sensor or an accelerometer. The sensor data may be used to determine stop events, which may be representative of instances in which the customer stopped while in transit to the merchant location. Upon arriving at the merchant location, the customer may be greeted by one or more individuals/associates of the merchant location. The individuals/associates may check-in the customer using a device (e.g., a tablet device or mobile telephone). A signal or data representative of the check-in may be transmitted to the service provider 102 such that the service provider is aware of the specific time in which the customer was greeted by, or otherwise interacted with, an individual/associate at the merchant location.

Based on the stop events, the service provider may determine the time at which the customer arrived at the merchant location, such as when the customer stopped in a parking spot or area designated for the pick-up of items from the merchant location. To determine the arrival time, the service provider may determine the last stop event prior to the time at which the customer was greeted by an individual/associate at the merchant location. The time corresponding to the last most proximate stop event may be determined to be the specific time in which the customer parked/stopped at the merchant location. Previous stop events, even those stop events in proximity to the merchant location, may represent the customer waiting in the parking lot, stopping for a pedestrian, stopping at a traffic light in close proximity to the merchant location, and so on. The service provider may determine a difference between the arrival time and the greet/interaction time to estimate the total amount of time that the customer waited at the merchant location after arriving (e.g., the "wait time"). In some instances, the wait time may be subsequently provided to the merchant location and/or the associated merchant, which may allow the merchant location to reduce/minimize wait times. In other embodiments, the wait time may be provided to the merchant location in real-time, or near real-time, to indicate that the merchant location has yet to greet or check in that particular customer.

Accordingly, the service provider may determine a time at which a customer arrives at a merchant location without the use of any infrastructure or devices at the merchant location that detect the customer, a device of the customer, and/or a vehicle of the customer. Via one or more sensors of the customer device, the service provider may receive sensor data, such as GPS data, velocity data, acceleration data, and so on. Based on the sensor data, the service provider may determine each time the customer stops while he/she is in transit to the merchant location, including stops that are in close proximity to the merchant location. Based on a time at which the customer was greeted at the merchant location, the service provider may determine stops that are most proximate (e.g., closest in time) to that time, which may be prior to, or subsequent to, that time. The service provider may determine that the most proximate/recent stop (e.g., the last detected stop) is the customer arriving/parking at the merchant location, where previous stops may include the customer stopping at a stop light, waiting for pedestrians to cross a crosswalk, and so on. Based on a time of the most recent stop, the service provider may estimate an amount of time the customer waited before being greeted at the merchant location.

FIG. 1 illustrates an example system 100 for estimating a wait time of a customer at a merchant location based on sensor data obtained by a customer device of the customer while the customer is in transit to the merchant location. As shown in FIG. 1, the system 100 may include a service provider 102, one or more merchants 104, merchant devices 106 associated with the one or more merchants 104, one or more customers 108, and customer devices 110 associated with the customers 108. The service provider 102, the merchant devices 106, and/or the customer devices 110 may communicate via one or more networks 112. As shown, the service provider 102 may include, or be associated with, one or more content server(s) 114.

As described herein, customers 108 may place orders for items 116 to be picked up at a specific physical location of the service provider 102 or a merchant 104. When the customer 108 arrives at the merchant location, an associate or individual of the merchant location may greet the customer 108, or the customer 108 may check-in with the merchant location via their customer device 110 or a device at the merchant location (e.g., a tablet device). In order to maintain customer satisfaction and induce repeat customer business, the service provider 102, the merchant 104, and/or the merchant location may seek to reduce or minimize the amount of time that the customer 108 waits at the merchant location after arriving. For instance, the merchant location may seek to minimize the amount of time between the time at which the customer 108 arrives at the merchant location, to the time at which the customer 108 is greeted by an individual/associate or the time at which the customer 108 receives his/her items 116. It also may be desired to minimize a total amount of time the customer 108 spends at the merchant location when picking up items 116. An arrival time of the customer 108 at the merchant location may be determined using various devices at the merchant location, such as cameras, proximity sensors, check-in devices, and so on. However, the systems and processes described herein may determine the arrival time of the customer 108 at the merchant location without using such infrastructure located at the merchant location. The service provider 102 may estimate the amount of time that the customer 108 has waited at the merchant location after arriving using the systems and processes described herein.

With respect to item pick-up services, the amount of time on site at the merchant location may directly impact customer satisfaction and the likelihood that customers 108 will be repeat customers 108. Accordingly, the service provider 102, the merchant 104, and the merchant location may desire to minimize customer wait time. Customer wait time may correspond to an amount of time beginning at a first time at which the customer 108 arrives at a merchant location until a second time at which an individual/associate with the merchant location greets or otherwise interacts with the customer 108. This wait time may be seconds, or even minutes. However, in order to minimize wait time, the time at which the customer 108 actually arrives at the merchant location should be determined. As described above, the arrival time of the customer 108 may be determined based on cameras that capture images/video that depict the customer 108, or that depict a vehicle of the customer 108, which may be identified based on a license plate number. Proximity sensors may also determine when a customer 108 has arrived or parked. The arrival time of the customer 108 may also be determined as a result of the customer 108 checking in with the merchant location, such as via his/her customer device 110 or via a device at the merchant location. Absent of such hardware, however, existing systems are unable to determine the precise arrival time of the customer 108. Without knowing the arrival time of the customer 108 (e.g. the time at which the customer 108 stops at an area designated for item pick-up (e.g., a parking spot)), one cannot determine the amount of time that the customer 108 waited at the merchant location, or the total duration of time in which the customer 108 was present at the merchant location.

As stated above and herein, the service provider 102 may provide and/or maintain functionality that allows the service provider 102 to estimate an amount of time that a customer 108 has spent waiting at a merchant location of a merchant 104, such as a brick-and-mortar store or pick-up location (also referred to herein as a "physical location," a "store location," or a "physical store location"), subsequent to arrival at the merchant location. When the customer orders items 116 via a mobile application or website associated with the service provider 102, the customer 108 may elect to pick up the items 116 at a merchant location of the merchant 104 (or the service provider 102) that is preparing, providing, assembling, and/or packaging the ordered items 116. When the customer 108 initiates travel to the merchant location to pick up the ordered items 116, the customer 108 may indicate that via the mobile application/website, which causes such information to be transmitted to the content server(s) 114 of the service provider 102. This signal may indicate a current location of the customer 108.

The service provider 102 may send instructions to the merchant location to begin preparing the ordered items 116 for pick-up, which may include picking the ordered items 116 and/or assembling the ordered items 116. In some instances, the service provider 102 and/or the content server(s) 114 may determine the estimated time of arrival (ETA) of the customer 108 with respect to the merchant location periodically while the customer 108 is in transit to the merchant location. Possibly based on the signal indicating that the customer 108 is initiating travel and/or the ETA data, the service provider 102 may send such instructions to the merchant location when the customer 108 is within a threshold distance from, or is within a threshold amount of time from arriving at, the merchant location. In particular, preparing the ordered items 116 for pick-up may include obtaining the ordered items 116 from shelving, a refrigerator, a freezer, etc., and packaging the items 116 in bags or boxes. As a result, the ordered items 116 are ready for pick-up when the customer 108 arrives at the merchant location. This may allow for minimal wait time for the customer 108 once the customer 108 actually arrives at the merchant location. This may also minimize the amount of time spent by individuals at the merchant location to provide the ordered items 116 to the customer 108 once the customer 108 arrives, which may reduce costs of the merchant location. Awareness of the likely arrival time of the customer 108 may also reduce the amount of time that items 116 are waiting to be picked up, which may be important for perishable, refrigerated, and/or frozen items 116.

Provided that the ETA of the customer 108 is used to cause the merchant location to assemble/package the items 116 for pick-up, if the current ETA of the customer 108 is equal or less than a check-in ETA threshold (e.g., 5 minutes, 10 minutes, etc.), the service provider 102 may automatically check in the customer 108. At that point, an individual (or an automated mechanism) may begin gathering the ordered items 116 for pick-up. Moreover, when it is determined that the current ETA of the customer 108 is equal to or less than an arrival threshold (e.g., 1 minute, 2 minutes, etc.), the service provider 102 may determine that the customer 108 has arrived, or will shortly arrive at the merchant location. Via an instruction from the service provider 102, or via a device maintained by the merchant location, an individual at the merchant location may greet the customer 108 when he/she arrives, and the ordered items 116 may be provided to the customer 108.

In various embodiments, the service provider 102 may be any entity, server(s), platform, etc., that offers items 116 (e.g., products, services, food/drink items, etc.) to customers 108 via an electronic marketplace (e.g., a website, a mobile application, etc.) associated with the service provider 102. That is, the customers 108 may access the electronic marketplace via corresponding customer devices 110 for the purpose of searching for, viewing, selecting, acquiring (e.g., purchasing, leasing, renting, borrowing, lending, etc.), etc., items 116. The items 116 may be provided directly by the service provider 102, or may be provided by the service provider 102 on behalf of a different entity, such as the merchants 104. That is, via a website, an electronic marketplace, and/or a mobile application associated with the service provider 102, the customers 108 may place orders for items 116 to be provided by the merchants 104. Alternatively, customers 108 may place orders directly with the merchants 104, such as via a merchant website, a mobile application associated with a merchant 104, etc. In some embodiments, provided that one or more ordered items 116 are to be prepared/provided by a merchant 104, the merchant 104 may prepare/provide the item(s) 116 at one or more physical merchant locations of the merchant 104 (e.g., a warehouse, a retail store, a fulfillment center, etc.). If a merchant 104 is mobile in nature and offers items 116 at different locations at different times (e.g., a food truck), the mobile merchant 104 may prepare/provide the ordered items 116 at their current location. The ordered items 116 may be delivered to a delivery location associated with the customer 108 (e.g., a residence, a workplace, etc.), or the ordered items 116 may be picked up by the customer 108 at a physical merchant location of the merchants 104.

The merchants 104 may include any entity that provides items 116 (e.g., products, services, etc.) to the customers 108. The items 116 may be offered for sale, lease, rent, etc., via a physical merchant location (e.g., a brick-and-mortar retail store), via a merchant-branded website (and/or a website associated with the service provider 102 or another entity), or via an application that resides on the customer devices 110. The items 116 may be offered by the service provider 102 via a mobile application or website, ordered by the customer 108 via the mobile application/website, and the items 116 may be picked up by the customer 108 at one of one or more merchant locations of the merchant 104. For instance, assuming that a merchant 104 is a grocery store chain having multiple physical grocery stores in a region, the customer 108 may select which physical grocery store that he/she would like to pick up the ordered items 116. In some embodiments, the merchant 104 may be the service provider 102 itself, or may be associated with the service provider 102. For instance, the items 116 ordered by the customer 108 via the mobile application/website of the service provider 102 may be picked up at a physical retail location or a physical pick-up location of the service provider 102. Moreover, regardless of whether the physical location is associated with the service provider 102 or a third-party merchant 104, any type of items 116 may be ordered and picked up, including food or drink items 116, flowers, non-food/drink items 116 (e.g., electronics, houseware, clothing, music, videos, etc.), and so on.

Each merchant 104 may have one or more associated merchant devices 106. In some embodiments, a merchant 104 may be associated with multiple merchant devices 106 such that individual employees or representatives of the merchant 104 may operate a merchant device 106 (e.g., handheld device, tablet, terminal, a point-of-sale (POS) system/device, a device to receive payment, etc.). The merchant devices 106 may be used by the merchants 104 to determine the ETA of customers 108, receive instructions from the service provider 102, check in customers 108, identify orders placed by customers 108, identify items 116 that are to be picked up by customers 108, send notifications to customers 108, and so on.

Moreover, the customers 108 may include any person or entity that interacts with the service provider 102 and/or merchants 104 for the purpose of ordering, acquiring, purchasing, etc., items 116 from the service provider 102 on behalf of the merchants 104. As discussed herein, the customers 108 may include in-store customers 108 that purchase or consume the items 116 provided by the merchants 104 at the current physical location of the merchants 104, or remote customers 108 that order items 116 via the service provider 102 (e.g., the mobile application or website) and travel to the merchant location to pick up the ordered items 116. The customers 108 may interact with the service provider 102 and/or the merchants 104 via corresponding customer devices 110, which may include cellular telephones, tablet devices, laptop computers, desktop computers, gaming consoles, electronic book (eBook) reader devices, and so on. The customer devices 110 may be used by the customer 108 to place an order for items 116, determine a route to the merchant location, determine and/or send location data and/or ETA data to the service provider 102, obtain and send sensor data to the service provider 102, check in at the merchant location, select one or more alternative options to obtain the ordered items 116, and so on.

The network(s) 112 may facilitate communications and/or interactions between the content server(s) 114 of the service provider 102, the merchant devices 106, and/or the customer devices 110. The network(s) 112 may facilitate such communications/interactions via any type of network, such as a public wide-area-network (WAN) (e.g., the Internet), which may utilize various different technologies including wired and wireless technologies. Moreover, the content servers 114 may contain any number of servers that are possibly arranged as a server farm. Other server architectures may also be used to implement the content servers 114.

Moreover, the merchant devices 106, the customer devices 110, and/or the content servers 114 may include one or more processors 118 and computer-readable media 120, which is indicated in FIG. 1 as "CRM.". The processor(s) 118 may execute one or more modules 122 and/or processes to cause the merchant devices 106, the customer devices 110, and/or the content servers 114 to perform a variety of functions, as set forth above and explained in further detail in the following disclosure. In some embodiments, the processor(s) 118 may include a central processing unit (CPU), a graphics processing unit (GPU), both CPU and GPU, or other processing units or components known in the art. Additionally, each of the processor(s) 118 may possess its own local memory, which also may store program modules, program data, and/or one or more operating systems.

The computer-readable media 120 may include volatile memory (such as RAM), non-volatile memory (such as ROM, flash memory, miniature hard drive, memory card, or the like), or some combination thereof. The computer-readable media 120 may be non-transitory computer-readable media 120. The computer-readable media 120 may include, or be associated with the one or more modules 122 that perform various operations associated with the merchant devices 106, the customer devices 110, and/or the content servers 114. In some embodiments, the one or more modules 122 may include or be associated with computer-executable instructions that are stored by the computer-readable media 120 and that are executable by the processor(s) 118 to perform such operations. The merchant devices 106, the customer devices 110, and/or the content servers 114 may also include additional components not listed above that may perform any function associated with the merchant devices 106, the customer devices 110, and/or the content server(s) 114.

Via the mobile application and/or website associated with the service provider 102, the customer 108 may place an order for one or more items 116 that are to be fulfilled by a merchant 104 (or the service provider 102). When placing the order, the service provider 102 may indicate that the items 116 are to be picked up at a merchant location of the merchant 104, or the customer 108 may select a specific merchant location of one or more merchant locations of the merchant 104 for pick-up of the ordered items 116 (e.g., "item pick-up 124"). Provided that a merchant location is to prepare/provide the ordered items 116 for pick-up, the service provider 102 may send order data to a merchant device 106 at that merchant location. The order data may identify the items 116 included in the order, the customer 108 that placed the order, a time slot or period (e.g., 3:00-5:00 pm) for pick-up of the ordered items 116, and any other information that could be used to identify the items 116 at the merchant location for assembly, assemble the ordered items 116, and provide the ordered items 116 when the customer 108 arrives at the merchant location.

In various embodiments, the service provider 102 may maintain, or at least have access to, merchant store data associated with different merchants 104 and/or merchant locations. For a particular merchant 104, the merchant store data may indicate one or more merchant locations, stores, or pick-up locations of the merchant 104, the hours of operation/pick-up of those merchant locations (indicating when each merchant location is open or closed), an inventory of items 116 at each merchant location, a number of employees at each merchant location at different times, a number of orders that each merchant location is currently processing of fulfilling, and/or a number of orders that each merchant location has yet to process or fulfill. The number of currently processed orders and the number of unfulfilled orders may indicate a current and future capacity of the merchant locations to fulfill future orders, as well as an estimated wait time for customers 108 when the customers 108 arrive at the merchant locations to pick up ordered items 116.

Provided that a customer 108 placed an order for one or more items 116 to be picked up at a merchant location, the customer 108 may indicate when he/she is initiating travel or is traveling to the merchant location to pick up the ordered item(s) 116. This customer pick-up signal may constitute the customer 108 sending a message (e.g., a text message, an e-mail message, a chat message, etc.) to the service provider 102, or the customer 108 indicating that he/she is leaving to travel to the merchant location via the mobile application/website of the service provider 102. Either concurrently with placement of the order, or at a subsequent time, the customer 108 may press a button indicating that he/she is initiating/beginning travel to the merchant location to pick up the ordered items 116 (e.g., an "on my way" button). The customer pick-up signal may also be based on data (e.g., a notification, a geofence, etc.) that is sent to, or that resides on, the customer device 110. That data may execute on the customer device 110 and indicate that the customer 108 is in fact in transit to the merchant location. For instance, if it is determined that the customer 108 is within a threshold distance from the merchant location, the service provider 102 may begin to receive or obtain the sensor data 126 and/or the stop event data 132. Accordingly, in either instance, the customer pick-up signal may indicate to the service provider 102 and/or the merchant location that the customer 108 intends to pick up the ordered items 116.

Upon receiving the customer pick-up signal, or at a different time, the service provider 102 may receive, from the customer device 110 of the customer 108, sensor data 126. The sensor data 126 may be received on a periodic basis (e.g., every second, every 30 seconds, every minute, etc.) while the customer 108 is in transit to the merchant location. Moreover, the sensor data 126 may include location data (e.g., GPS data) that are obtained by a location/GPS sensor of the customer device 110 and that indicate a current location of the customer 108. The sensor data 126 may also include velocity data that is obtained by one or more motion sensors of the customer device 110 and that indicate a velocity/speed of the customer 108 at different times while the customer 108 is in transit to the merchant location. The sensor data 126 may further include acceleration data that is obtained by an accelerometer of the customer device 110 and that represents a change in velocity of the customer 108 while the customer 108 is in transit to the merchant location. Other types of sensor data 126 that are obtained by different types of sensors (e.g., magnetometer, altimeter, etc.) and that indicate times at which the customer 108 is moving or is stationary are contemplated herein.

When the customer 108 arrives at the merchant location to pick up his/her items 116, the customer 108 may be greeted by an individual/associate at the merchant location (e.g., an employee). For instance, an individual/associate at the merchant location may greet, or interact with, the customer 108 in order to confirm the identity of the customer 108, which may be used to determine which items 116 are to be picked up by the customer 108. The individual/associate may input information into a device (e.g., a mobile telephone, a tablet device, etc.) indicating that the customer 108 is at the merchant location to pick up his/her items 116. This data, represented by customer interaction indication 128, may be sent to the content server(s) 114 of the service provider 102 by that device. In certain embodiments, the customer interaction indication 128 may be sent to the service provider 102 in response to the customer 108 inputting information into the device, such as the customer 108 checking in with the merchant location, for instance. In any event, the customer interaction indication 128 may allow the service provider 102 to confirm that the customer 108 has been greeted or contacted by an individual/associate at the merchant location, and to confirm that the customer 108 has arrived at the merchant location. The service provider 102 may determine a time at which this information is inputted into the device, or a time at which the customer interaction indication 128 is sent to the service provider 102, which may be referred to as a customer interaction time 130. The customer interaction time 130 may be maintained by the service provider 102 in association with the customer 108 and the merchant location.

Based on the sensor data 126 received from the customer device 110, the service provider 102 may determine or generate stop event data 132. The stop event data 132 may include one or more stop events that indicates times and locations at which the customer 108 is believed to have stopped moving. The stop events may be generated as a result of the location of the customer device 110 remaining the same, possibly for a threshold amount of time (e.g., 10 seconds, 30 seconds, 1 minute, etc.). A stop event may also be determined as a result of the velocity of the customer device 110 and/or an acceleration of the customer device 110 being zero, or being at or less than a threshold amount, for a period of time. Any of these scenarios may indicate that the customer device 110 (and the customer 108) is not moving (e.g., has stopped). Stop events may correspond to the customer 108 stopping at a traffic light, stopping to allow a pedestrian to cross a street or parking lot, parking at an area or parking spot at the merchant location designated for the pick-up of items 116 by customers 108, and so on. Therefore, the service provider 102 may receive the sensor data 126 from the customer device 110 and generate the stop event data 132 based on the sensor data 126. In other embodiments, however, the customer device(s) 110 may generate the stop event data 132 based on the sensor data 126 and then send the stop event data 132 to the content server(s) 114, possibly without sending the sensor data 126. Accordingly, in those embodiments, the service provider 102 may not receive the sensor data 126 and may instead just receive the stop event data 132 that indicates the stop events of the customer 108. The stop event data 132 may identify the stop events or the service provider 102 may determine the stop events from the stop event data 132.

The service provider 102 may analyze the stop event data 132 to identify a stop event that corresponds to the customer 108 arriving and stopping at the merchant location. In some instances, the service provider 102 may identify the customer interaction time 130 and then identify the most recent/proximate stop event prior to the customer interaction time 130. The most recent stop event prior to the customer interaction time 130 may indicate the last time the customer 108 stopped, which is likely to be when the customer 108 parked/stopped at a parking spot/area designated for customers 108 to pick up items 116 at the merchant location. Stop events prior to the most recent stop event may indicate other times at which the customer 108 stopped, such as the customer 108 stopping at a traffic light or the customer 108 stopping at a different merchant 104 (e.g., a gas station, a drive-thru restaurant, etc.). In various embodiments, the service provider 102 may determine a stop event if the customer device 110 has not moved for a predetermined/threshold amount of time.

The service provider 102 may determine an estimated customer arrival time 134 that corresponds to the most recent stop event. The estimated customer arrival time 134 may indicate a time that the customer 108 likely arrived at the merchant location, such as a time that the customer 108 stopped in a parking spot or area designated for customers 108 to pick up items 116 at the merchant location. In some instances, the time at which the sensor data 126 was obtained or transmitted may vary from the time at which the content server(s) 114 received the sensor data 126. As described in additional detail herein, the variance or latency between the device time and the server time may result from a poor network signal, a lack of network bandwidth, and so on. A time adjustment 136 may be performed by the service provider 102 when determining the estimated customer arrival time 134 and/or an estimated customer wait time 138. The time adjustment 136 may also be based on a fixed offset that results from, or is caused by, a first time of the customer device 110 being set differently than a second time of the content server(s) 114.

Based on the customer interaction time 130 and the estimated customer arrival time 134, the service provider 102 may determine or estimate the customer wait time 138 for the customer 108 at the merchant location. The estimated customer wait time 138 may represent an amount of time between the estimated customer arrival time 134 (e.g., when the customer 108 arrived at the merchant location) and the customer interaction time 130 (e.g., when an associate/individual greeted the customer 108). That is, the customer wait time 138 corresponds to the amount of time that the customer 108 was waiting at the merchant location before being greeted or interacted with in some manner. In some embodiments, the service provider 102 may send a wait time notification 140 to the merchant 104 and/or the merchant location, either in real-time or after the customer 108 picks up his/her items 116. The wait time notification 140 may indicate the estimated amount of time that the customer 108 waited at the merchant location before he/she was greeted by an individual/associate at the merchant location.

Figure 2:
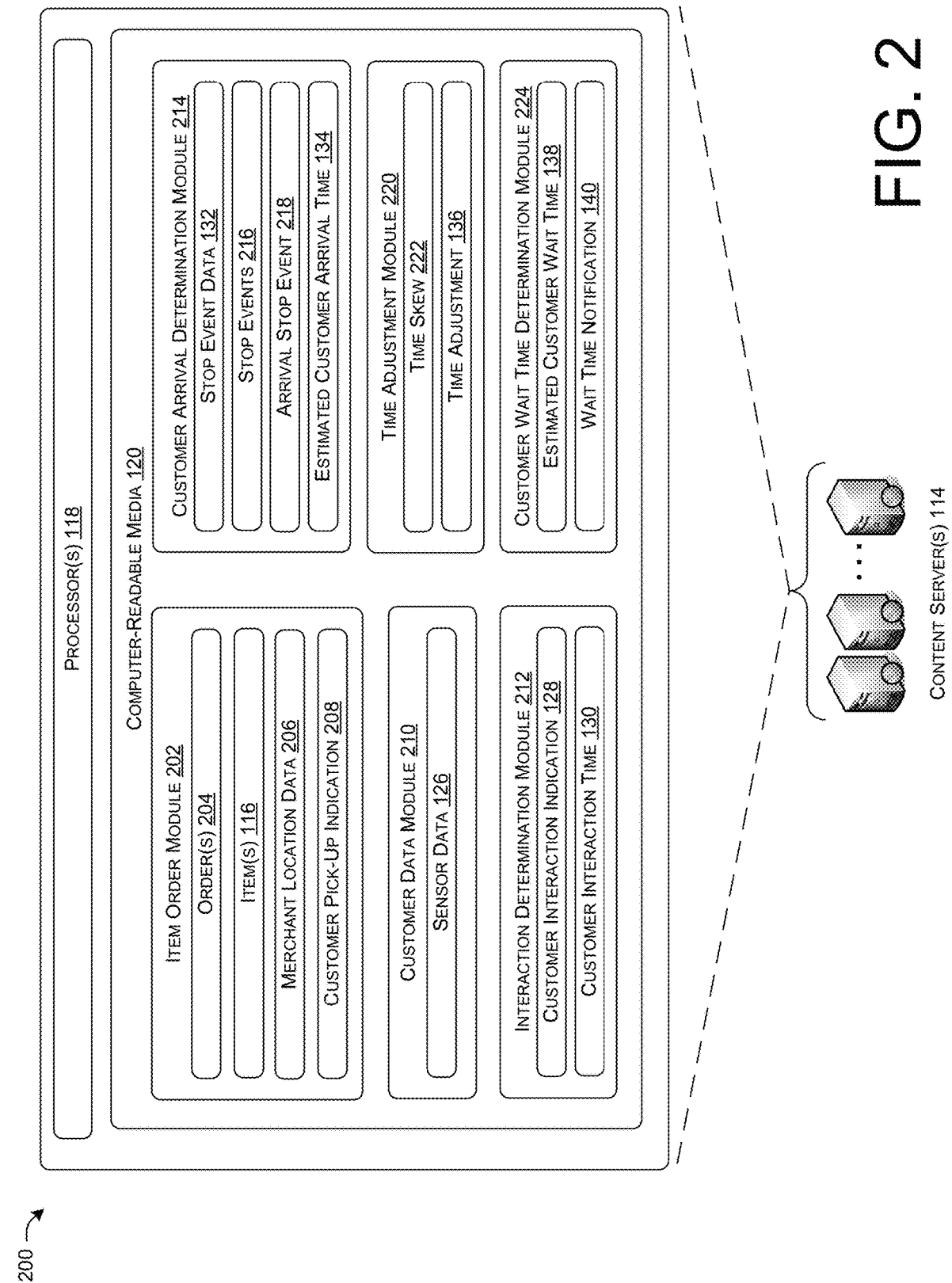
FIG. 2 illustrates an example content server that estimates a wait time of a customer at a merchant location based on sensor data obtained by a customer device of the customer.

FIG. 2 illustrates an example system 200 that depicts the content server(s) 114 illustrated in FIG. 1. As shown, the content server(s) 114 includes the one or more processor(s) 118, the computer-readable media 120, and various modules 122. In some embodiments, the service provider 102 may determine, based on sensor data 126 obtained by a customer device 110 of a customer 108 that is in transit to a merchant location to pick up one or more items 116, an estimated wait time 138 of the customer 108 at the merchant location.

In various embodiments, the computer-readable media 120 may include an item order module 202. As described with respect to FIG. 1, the service provider 102 may receive, from customer devices 110 of customers 108, orders 204 for items 116 to be picked up from a particular merchant location. The service provider 102 may also maintain, or at least have access to merchant location data 206 associated with one or more merchant locations, which indicates a physical location at which the merchant locations are located (e.g., an address, a description of the location/area, etc.). For instance, via a website or mobile application associated with the service provider 102, a customer 108 may shop and place an order for food items 116 to be provided by a grocery merchant 104 that has multiple store locations. Instead of having the food items 116 delivered, the customer 108 may select one of the store locations to pick up the ordered food items 116, as well as a time period/slot (e.g., 3:00-5:00 pm) at which the customer 108 is scheduled to pick up the food items 116. While placing the order 204, or at a later time, the customer 108 may indicate that he/she is leaving to pick up the ordered items 116, meaning that the customer 108 is initiating travel to the merchant location. As stated herein, the customer 108 may indicate that he/she is initiating travel to the merchant location as a result from the customer 108 sending an e-mail message, a text message, a chat message, possibly via the mobile application/website, or from the customer 108 selecting a button or other selectable option via the mobile application/website. A determination that the customer 108 has begun traveling to the merchant location to pick up the ordered items 116 may be referred to herein as a "customer pick-up indication 208."

Upon an occurrence of the customer pick-up indication 208, meaning that the customer 108 is currently in transit to the merchant location to pick up the ordered items 116, or at any time while the customer 108 is in transit to the merchant location, a customer data module 210 may obtain or receive sensor data 126 from the customer device 110 of the customer 108. The sensor data 126 may be GPS data and may indicate a current location of the customer 108. Such location data may be obtained via the mobile application of the service provider 102 or by one or more sensors (e.g., location sensor, GPS sensor, etc.) of the customer device 110. Provided that the customer 108 is currently traveling to the merchant location, the GPS/location data may indicate that the current location of the customer 108 is changing over time. In other embodiments, the sensor data 126 can be obtained and/or received from the customer device 110 at any time, including when the customer 108 opens and/or interacts with the mobile application used to place orders 204, when the customer 108 selects a merchant 104 in which he/she would like to order items 116 from, when the customer 108 selects a merchant location of the merchant 104 at which to pick up the items 116, when the customer 108 places the order 204, and/or when the customer 108 indicates that he/she is beginning to travel to the merchant location.

In other embodiments, the sensor data 126 may include velocity data and/or acceleration data captured or obtained by one or more sensors of the customer device 110, such as motion sensors, accelerometers, gyroscopes, and so on. Upon obtaining these types of sensor data 126, the customer device 110 may send the sensor data 126 to the content server(s) 114 of the service provider 102, where the sensor data 126 is then maintained and analyzed by the service provider 102. Other types of sensor data 126 that are captured by one or more sensors of the customer device 110 are also contemplated herein.

In various embodiments, the sensor data 126 will not be collected by the customer device 110 or the mobile application, and will not be sent to the service provider 102, the merchant 104, and/or the merchant location unless the customer 108 first opts in to (e.g., agrees to) the collection and sharing of such sensor data 126. That is, the sensor data 126 will not be collected or received by the service provider 102 unless the customer 108 first provides authorization.

An interaction determination module 212 of the content server(s) 114 may receive the customer interaction indication 128 and determine a corresponding customer interaction time 130. In some instances, when a customer 108 arrives at a merchant location, an individual or associate of the merchant location (e.g., an employee) will typically greet the customer 108. For instance, the associate may determine that the customer 108 has arrived and will greet or interact with the customer 108 in order to determine an identity of the customer 108, which may be used to determine the items 116 ordered by the customer 108, and which may allow the merchant location to facilitate pick-up of those items 116. In some embodiments, the associate may possess a device or tool, such as a mobile telephone or tablet device (e.g., the merchant device 106), that is used to identify the customer 108. The merchant device 106 may maintain a mobile application that is used to identify the customer 108, check the customer 108 in, identify items 116 for pick-up, and gather those items 116 for the customer 108. The merchant device 106/application may also be used to determine a location of the customer 108 (e.g., a designated parking spot/area for item pick-up 124) and/or determine when the customer 108 has been located at the merchant location. In some instances, the associate at the merchant location may first request identification of the customer 108 (e.g., a name, identification information, etc.) for security purposes, and to ensure that the customer 108 is in fact receiving the items 116 he/she ordered. Upon identifying the customer 108, the customer interaction indication 128 may be sent from the merchant device 106 to the content server(s) 114.

The customer interaction indication 128 may also be sent as a result of the customer 108 checking himself/herself in via a merchant device 106 located at the merchant location, such as via a tablet device that is accessible to customers 108. In other embodiments, the customer 108 may indicate that he/she has arrived at the merchant location using his/her customer device 110, such as via a mobile application or website associated with the service provider 102. Regardless of how it is determined that the customer 108 has arrived at, or is currently located at, the merchant location, the customer interaction indication 128 may serve as a trigger that allows the service provider 102 to unequivocally determine that the customer 108 has in fact arrived at the merchant location. However, the customer interaction indication 128 may not indicate the specific time that the customer 108 actually arrived at the merchant location, as the customer 108 may have been waiting for a period of time before being greeted by an associate. This amount of time may be seconds, or even minutes.

The interaction determination module 212 may determine a customer interaction time 130 that corresponds to the customer interaction indication 128. For instance, the customer interaction indication 128 may be associated with a timestamp that corresponds to a time at which the customer 108 was greeted by an associate, a time that the customer 108 checked in at the merchant location via a merchant device 106, or a time at which the customer 108 checked in via his/her customer device 110. For instance, the customer interaction time 130 may correspond to a time at which an associate at the merchant location initially greeted or otherwise interacted with the customer 108 once he/she arrived at the merchant location. Accordingly, the customer interaction time 130 may indicate a confirmed time that the customer 108 was located at the merchant location, regardless of whether the customer 108 had just arrived or had been waiting at the merchant location for a period of time. As discussed in additional detail herein, based on the customer interaction time 130, the service provider 102 may determine the last time the customer 108 stopped, which may indicate a time at which the customer 108 actually arrived at the merchant location, such as when the customer 108 parked/stopped in a parking space/area that is designated for item pick-up 124 by customer 108.

A customer arrival determination module 132 may receive, determine, and/or generate the stop event data 132, which may be based on the sensor data 126 received from the customer device 110. From the stop event data 132, one or more stop events 216 may be determined. The stop events 216 may be received from the customer device 110 or determined/generated by the service provider 102 based on an analysis of the stop event data 132. Moreover, each of the stop events 216 may represent instances in which the customer 108 stopped while in transit to the merchant location. The stop events 216 may be determined as a result of the customer device 110 not moving, or moving less than a threshold amount, for a threshold amount of time (e.g., 5 seconds, 10 seconds, 30 seconds, 1 minute, etc.). For instance, a stop event 216 may be determined if a change in location of the customer device 110 is less than a threshold amount for a predetermined amount of time. The stop events 216 may also be determined as a result of a velocity or acceleration, or a change thereof, being zero for a threshold amount of time. The customer device 110 not moving for a period of time, or the velocity/acceleration of the customer device 110 being zero, or close to zero, for a period of time likely indicates that the customer 108 has stopped. Stop events 216 may represent the customer 108 stopping at a traffic light, stopping to allow pedestrians to cross a crosswalk, stopping in heavy traffic, stopping at a different merchant 104, arriving and stopping at an area designated for the pick-up of items 116 at the merchant location (e.g., a parking space or lot), and so on.

The stop events 216 may also be determined based on a distance from the customer 108 to the merchant location. For example, assume that the sensor data 126 includes location data of the customer device 110, such as GPS data. In some instances, the GPS data received from the customer device 110 may be relatively accurate, and may indicate with a high confidence a previous or current location of the customer 108. The service provider 102 may determine a threshold distance from the merchant location. If the location data received from the customer device 110 indicates that the location of the customer device 110 is equal to or less than the threshold distance, then the service provider 102 may determine that this corresponds to a stop event 216 of the customer 108, and that the customer 108 has arrived at the merchant location. The stop event 216 may also be determined if the location of the customer 108 is equal to or less than the threshold distance, and that the location of the customer 108 did not change, or changed less than a threshold amount, for a period of time (e.g., 5 seconds, 10 seconds, 30 seconds, etc.).

As stated herein, the ETA of the customer 108 with respect to the merchant location may be determined and tracked/monitored while the customer 108 is in transit to the merchant location. In some embodiments, the service provider 102 may begin to receive the sensor data 126, receive the stop event data 132, and/or determine the stop events 216 of the customer 108 if the ETA indicates that an estimated amount of travel time to the merchant location is equal to or less than a threshold amount (e.g., 5 minutes, 2 minutes, 30 seconds, 10 seconds, etc.). In other embodiments, the stop events 216 may be determined based on the ETA of the customer 108 with respect to the merchant location.

In some embodiments, the sensor data 126 may be sent from the customer device 110 to the content server(s) 114 and the service provider 102 may determine the stop events 216 from the sensor data 126. However, in other embodiments, the customer device 110 may send the stop events 216 to the content server(s) 114, such that the service provider 102 receives specific stop events 216, as opposed to GPS coordinates, velocity data, acceleration data, etc. If provided by the customer device 110, the stop events 216 may correspond to signals that indicate that the customer 108 has stopped, at least for a short duration of time. For instance, based on the sensor data 126, the service provider 102 and/or the customer device 110 may determine that the customer 108 was moving at a first time and that the customer 108 was stopped at a second time that is subsequent to the first time. As result, it may be determined that the customer 108 likely stopped sometime between the first time and the second time.

Furthermore, a mobile application residing on the customer device 110 may obtain the sensor data 126, identify stop events 216 based on the sensor data 126, and then send data/information representative of the stop events 216 to the content server(s) 114. The stop events 126 may also be identified based on different operating systems (e.g., Android®, iOS®, etc.) associated with and/or running on the customer device 110. For instance, a first operating system may use acceleration data obtained by an accelerometer of the customer device 110 to classify motion of the customer device 110 into different categories or states (e.g., moving, driving, stopped, unknown, etc.). Such classifications may indicate stop events 216. In other embodiments, the stop events 216 may be determined based on a sample size of velocity data obtained by one or more sensors of the customer device 110. For example, it may be determined that the customer 108 has stopped or is stationary at a certain point of time if a threshold number of velocity data points obtained by the customer device 110 are zero. In this embodiment, if eight out of ten velocity data points indicate that the customer device 110 is stationary, it may be concluded that the customer 108 has stopped at the time at which those velocity data points were captured. Earlier or later velocity data points may be considered to determine if the customer device 110 was stationary (e.g., not moving) before or after the ten velocity data points identified above. For instance, if a velocity data point is collected every second, the prior ten velocity data points may be considered to determine if the customer device 110 was stationary at that time. Confidence values may also be assigned to various stop events 216, where the confidence values represent a likelihood that the customer 108 was stationary/stopped at that particular time. The service provider 102 and/or the customer device 110 may disregard stop events having a confidence value that is below a confidence value threshold.

The service provider 102 may determine a predetermined distance from the merchant location in which stop events 216 are received or determined. For instance, in order to determine when the customer 108 has arrived at the merchant location, the service provider 102 may only be concerned about stop events 216 that are within a threshold distance (e.g., 200 feet, 500 feet, 1000 feet, a half mile, etc.) from the merchant location. Stop events 216 outside of that distance are unlikely to represent the customer 108 stopping at the merchant location itself, and likely instead represent the customer 108 stopping at a traffic light, stopping for traffic, allowing a pedestrian to cross the street, and so on. The threshold distance may serve as a radius of a circle that surrounds the merchant location. As discussed in further detail herein, the service provider 102 may identify one or more concentric circles surrounding a merchant location, were each circle corresponds to a different threshold/predetermined distance.

Upon identifying the customer interaction time 130, which represents a time at which the customer 108 was initially greeted or otherwise interacted with after arriving at the merchant location, the service provider 102 may identify an arrival stop event 218 that likely represents the customer 108 stopping after arriving at the merchant location. Since the service provider 102 is aware of the time the customer 108 was greeted, the service provider 102 may identify a stop event 216 that is most proximate in time prior to the customer interaction time 130. This stop event 216 would be the arrival stop event 218. That is, the service provider 102 may work backwards from the customer interaction time 130 to determine the last time the customer 108 stopped. In other embodiments, the arrival stop event 218 may correspond to a time that is subsequent to the customer interaction time 130, possibly if the sensor data 126 and/or the stop event data 132 is not received in chronological order. This arrival stop event 218 likely corresponds to the customer 108 stopping in a parking spot/area that is designated for the pick-up of items 116 at the merchant location. Stop events 216 prior to the determined arrival stop event 218 may represent times at which the customer 108 stopped prior to arriving at the merchant location, such as the customer 108 stopping at a traffic light, stopping at a different merchant 104, waiting for a pedestrian to cross the road, and so on. The stop events 216, including the arrival stop event 218, may be determined as a result of the sensor data 126 indicating that the customer 108/customer device 110 has remained stationary for a threshold amount of time. Since the arrival stop event 218, or the sensor data 126 associated therewith, has a corresponding timestamp, the service provider 102 may determine a time at which the customer 108 stopped/arrived at the merchant location, which may be referred to herein as an estimated customer arrival time 134.

As stated herein, the stop events 216 may be associated with a time, a timestamp, or a time duration. In some instances, the service provider 102 may receive the customer interaction indication 128 prior to receiving the sensor data 126 and/or the stop event data 132, although the sensor data 126 and the stop event data 132 was captured/determined prior to the customer 108 being greeted by an associate at the merchant location. That is, the stop events 216 may be receive out of order with respect to the customer interaction indication 128, such that the service provider 102 may receive the signal that the associate has greeted the customer 108, while the service provider 102 has yet to receive a signal indicative of the customer 108 stopping/arriving at the merchant location prior to that time. Since each of the stop events 126 are associated with a specific time, the service provider 102 may determine the order of the events based on timestamps associated with each event.

In additional embodiments herein, a time adjustment module 220 may determine a time skew 222 between a device time (or a first time) associated with the customer device 110 and a server time (or a second time) associated with the content server(s) 114 and perform a time adjustment 136 based on the determined time skew 222. In some instances, the device time and the server time may deviate significantly, such as by seconds or even minutes. For instance, the customer device 110 and/or the content server(s) 114 may not sync regularly or may sync at different intervals, which may cause the device time to drift from the server time. The variance in the device time and the server time may also result from latency in data transmitted between the customer device 110 and the content server(s) 114, a poor cellular signal associated with the customer device 110, limited network bandwidth, and so on. For instance, if the customer 108 is in transit to the merchant location and the customer 108 travels through a tunnel where no cellular signal is available, the customer device 110 may be unable to transmit sensor data 126 that was captured while the customer 108 was in the tunnel until a stronger cellular signal was available (e.g., the customer 108 is now out of the tunnel). The sensor data 126 will be transmitted at that time, but the sensor data 126 obtained while the customer 108 was in the tunnel may have a timestamp that indicates a time at which the sensor data 126 was captured. Variance may still occur between the device time and the server time in this scenario. Although variance between the device time and the server time may be less when there is good network coverage or a strong WiFi signal, the time variance may nevertheless occur. The time adjustment 136 may be performed or taken into consideration when determining the estimated customer arrival time 134 and/or the estimated customer wait time 138.

The computer-readable media 120 may also maintain a customer wait time determination module 224 that may determine an estimated customer wait time 138 of the customer 108, and possibly send one or more wait time notifications 140. The customer wait time 138 may be estimated based on the estimated customer arrival time 134 and the customer interaction time 130. More particularly, the customer wait time 138 may be estimated by determining a difference between the estimated customer arrival time 134 and the customer interaction time 130. Accordingly, the estimated customer wait time 138 corresponds to an amount of time beginning at a first time at which the customer 108 is believed to have arrived at the merchant location, such as by stopping at parking spot/area designated for the pick-up of items 116 at the merchant location, and ending at a second time at which an associate greeted or otherwise interacted with the customer 108. This amount of time may be seconds or minutes.

The estimated customer wait time 138 may be a metric that can be used in different manners. For instance, for a particular merchant location, the service provider 102 may determine the estimated wait times 138 for customers 108 that pick up items 116 at the merchant location and then determine an average wait time 138 at that merchant location. The average wait time 138 per customer 108 may also be for all merchant locations of the merchant 104. The average wait time 138 may be more granular, and may apply to different times or time periods, different days of the week, and so on. In some instances, if the estimated customer wait time 138 for a customer 108 met or exceeded a predetermined/threshold amount (e.g., one minute, two minutes, five minutes, etc.), the service provider 102 may offer to refund the order 204, or may offer a discount, a coupon, and so on.

In some embodiments, the wait time notification 140 may be sent to the merchant location, and may indicate prior wait times 138 of customers 108, where the prior wait times 138 correspond to the amount of time a customer 108 waited at the merchant location after arriving and before being greeted by an associate. The wait time notification 140 may indicate individual wait times 138 of specific customers 108, and/or average wait times 138 experienced by customers 108 at the merchant location. The merchant location may use this data in order to minimize wait times 138 for customers 108 at the merchant location for subsequent orders, such as by increasing the number of associates at the merchant location, causing the associates to more actively determine when customers 108 are arriving to pick up items 116, and so on. Wait times 138 specific to a customer 108 may be sent to the customer device 110 of that customer 108 via a wait time notification 140.

The service provider 102, in some instances, may determine or estimate the wait time 138 of a customer 108 at a merchant location in real-time, or near real-time. For instance, the service provider 102 may initially determine a threshold distance surrounding the merchant location (e.g., 100 feet, 200 feet, etc.), where stop events 216 within that threshold distance are likely to be arrival stop events 218. That is, since the stop events 216 are in such close proximity to the merchant location, a customer 108 stopping within that threshold distance likely indicates that the customer 108 is stopping in an area designated for the pick-up of items 116 at the merchant location. The service provider 102 and/or the customer device 110 may determine an arrival stop event

218 of the customer 108 based on the sensor data 126 indicating that the customer 108 has stopped at a location that is within the threshold distance from the merchant location. Upon determining an arrival stop event 218, the service provider 102 may send a notification to a merchant device 106 at the merchant location. Such a notification may indicate to an associate that a customer 108 has arrived at the merchant location to pick up items 116. The associate, as a result of the notification, may greet or interact with the customer 108, or cause a different associate/individual to do the same. Accordingly, since the service provider 102 may determine when a customer 108 has arrived at the merchant location and notify the merchant location of the arrival of the customer 108, a wait time 138 of the customer 108 may be significantly reduced or minimized.

As additional data is received with respect to a particular merchant location, the service provider 102 may determine patterns with respect to stop events 216. More particularly, the service provider 102 may determine which stop events 216 correspond to arrival stop events 218 and which stop events 216 typically correspond to non-arrival stop events 216. For instance, the service provider 102 may determine that stop events 216 associated with a particular location or area correspond to customers 108 stopping at a traffic light or being in an area that typically has an increased amount of traffic. On the contrary, the service provider 102 may determine that stop events 216 that correspond to an area/location that is in close proximity to the merchant location are likely to be arrival stop events 218, which represent the customer 108 stopping at the merchant location to pick up his/her items 116 from the merchant location. The service provider 102 may determine with confidence that stop events 216 that are within a threshold distance from the merchant location are arrival stop events 218. For instance, once a customer 108 is within a threshold distance from the merchant location, the service provider 102 may determine that the next stop event 216 associated with the customer 108 will be the arrival stop event 218.

Moreover, the service provider 102 may determine multiple distances or radiuses that extend outward from the merchant location, which may result in concentric circles that surround the merchant location. Based on determined stop events 216 for previous customers 108 that traveled to the merchant location to pick up items 116, the service provider 102 may determine with varying levels of confidence whether a stop event 216 corresponds to an arrival stop event 218. The service provider 102 may determine the distances/radiuses based on this data. As an illustrative example, assume that the service provider 102 has identified two different distances (e.g., 500 feet and 1000 feet) that extend from the merchant location. Once a customer 108 is within the first, larger distance from the merchant location (e.g., 1000 feet), the service provider 102 may determine a first confidence that the next stop event 216 of the customer 108 is the arrival stop event 218 (e.g., 75%). Further, when the customer 108 is within the second, shorter distance from the merchant location (e.g., 500 feet), the service provider 102 may determine a second, greater confidence that the next stop event 216 of the customer 108 is the arrival stop event 218 (e.g., 90%).

For the purposes of this discussion, any type of machine learning model/technique and/or predictive model may be used to determine, calculate, generate, predict, etc., the data or times described herein. Examples of predictive models that may be utilized include group method of data handling, Naïve Bayes, k-nearest neighbor algorithm, majority classifier, support vector machines, random forests, boosted trees, Classification and Regression Trees (CART), neural networks, ordinary least square, regression analysis, and so on. Moreover, examples of machine learning techniques may include supervised learning, unsupervised learning, semi-supervised learning, classification analysis, regression analysis, clustering, etc. Moreover, any other types of algorithms may also be used.

The systems and processes described herein serve as technological solutions to multiple technological problems. For instance, without the use or cameras or proximity sensors, it is difficult, if not impossible, to determine when a customer 108 has arrived at a physical location (e.g., a merchant location). As a result, one is unable to determine how long a customer 108 has waited at the merchant location before being greeted or otherwise interacted with. The systems and processes provide a technological solution to this technological problem by identifying a time at which the customer 108 is greeted by an associate/individual at the merchant location. Based on sensor data 126 received from a customer device 110 of the customer 108, the service provider 102 may determine stop events 216 that correspond to times at which the customer 108 has stopped while in transit to the merchant location. The last detected stop event 216 prior to the greet time (e.g., the customer interaction time 130) may correspond to the arrival stop event 218 and a corresponding estimated customer arrival time 134 with respect to the merchant location. The difference between the customer interaction time 130 and the estimated customer arrival time 134 may constitute the amount of time the customer 108 waited since arriving at the merchant location and before the customer 108 has been greeted. An additional technological problem relating to clock skew 222 between the customer device 110 and the content server(s) 114 also exists. The systems and processes described herein provide a technological solution to this technological problem by determining a difference between a device time of the customer device 110 and a server time of the content server(s) 114. This time skew 222 may be considered when determining the wait time 138 of the customer 108 by applying a time adjustment 136.

Figure 3:
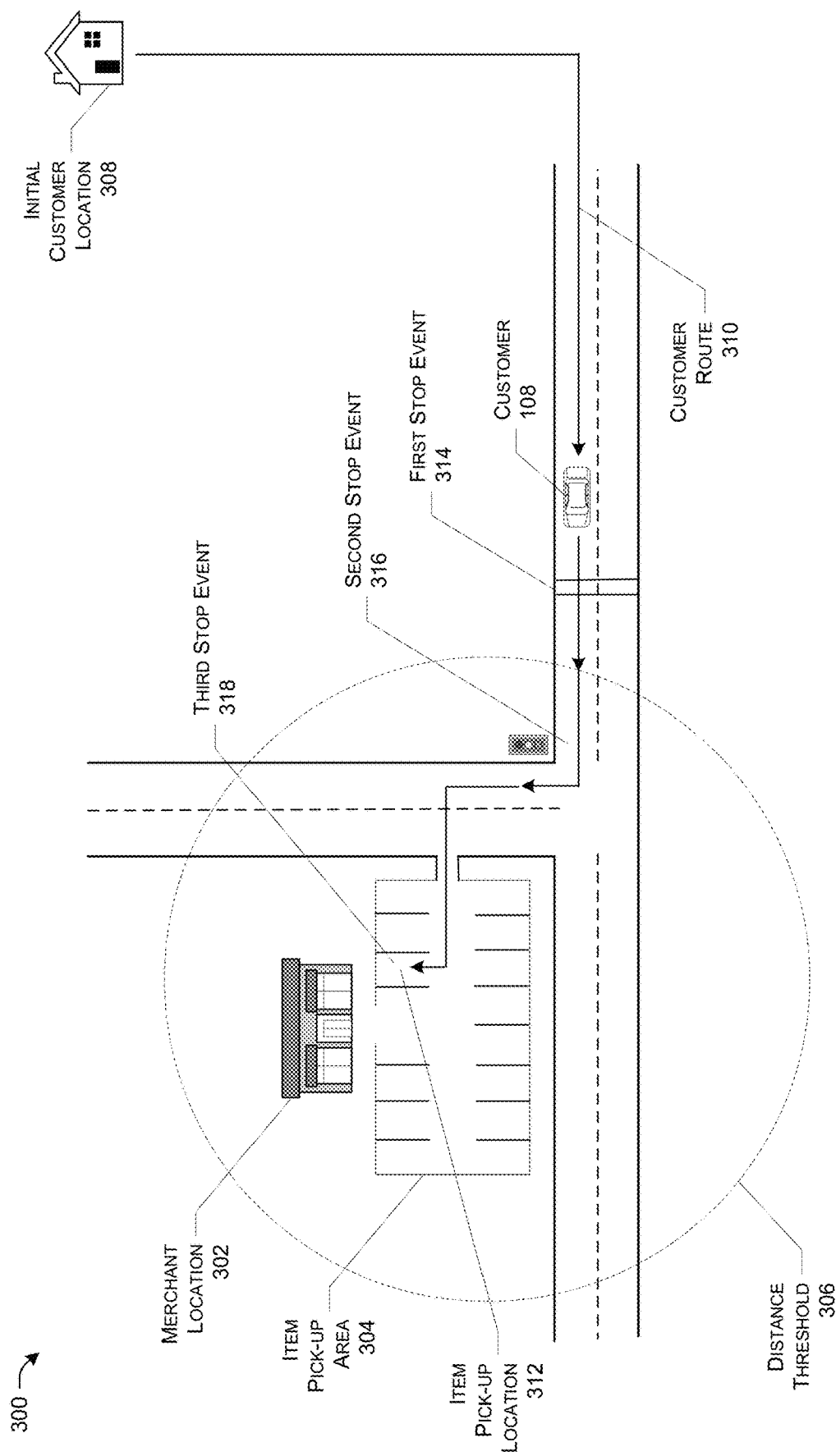
FIG. 3 is a diagram illustrating a merchant location, a customer, and a determination of stop events associated with the customer.

FIG. 3 illustrates an example diagram that depicts a customer 108 that is transit to a merchant location 302 to pick up items 116 from the merchant location 302. As shown in FIG. 3, the merchant location 302 may have an item pick-up area 304 at which customers 108 may use to pick up items 116 from the merchant location 302. For instance, the item pick-up area 304 may be a parking lot or other designated area proximate to the merchant location 302. The merchant location 302 may also be associated with a distance threshold 306, which may be determined by the service provider 102 for that particular merchant location 302. The threshold distance 306 may be used to determine whether stop events 216 of the customer 108 constitute an arrival stop event 218 at the merchant location 302.

FIG. 3 further illustrates an initial customer location 308, which may be a location from which the customer 108 initiated travel to the merchant location 302 (e.g., a residence, a workplace, a location detected by a customer device 110, etc.). The customer 108 may travel to the customer location 302 via a particular customer route 310, which is indicated by the arrows extending from the initial customer location 308 to the item pick-up location 312 within the item pick-up area 304. As shown, the customer 108 is illustrated as traveling to the merchant location 302 via a vehicle, such as a car. However, the customer 108 may be traveling to the merchant location 302 using other modes of transportation, such was walking, running, bicycling, using public transportation, etc. The item pick-up location 312 may be a parking spot or other designated area at which the customer 108 parks or stops to pick up his/her items 116 from the merchant location 302. The item pick-up location 312 may be within the item pick-up area 304.

While the customer 108 is in transit to the merchant location 302, the service provider 102 may receive, from the customer device 110 of the customer 108, sensor data 126. The sensor data 126 may include location data (e.g., GPS data), velocity data, acceleration data, and any other type of data that is captured by one or more sensors of the customer device 110 and that indicates whether the customer 108 is moving or not. Based on the sensor data 126, the customer device 110 may send, or the service provider 102 may determine, stop events 216 that indicate that the customer 108 has stopped while in transit to the merchant location 302. As illustrated, three distinct stop events 216 have been determined for the customer 108 while he/she has been in transit to the merchant location 302. A first stop event 314 at a first time may be determined based on the sensor data 126. Here, the first stop event 314 may correspond to the customer 108 stopping for a pedestrian to cross a crosswalk. A second stop event 316 may be determined at a second time that is subsequent to the first time. The second stop event 316 may correspond to the customer 108 stopping at a traffic light/signal. A third stop event 318 may be determined at a third time that is subsequent to the second time, and the third stop event 318 may correspond to the customer 108 stopping at the item pick-up location 312 within the item pick-up area 304.

In some embodiments, stop events 216 for the customer 108 may be determined once the customer 108 is within the threshold distance 306 from the merchant location 302. Here, the first stop event 314 may not be determined by the service provider 102, or may not be considered as an arrival stop event 218 since the customer 108 is outside of the threshold distance 306 from the merchant location 302. Moreover, the distance threshold 306 may be specific to the merchant location 302 and may vary between different merchant locations 302. The distance threshold 306 for a particular merchant location 302 may vary based on the amount of traffic in proximity to the merchant location 302 and/or the size of the item pick-up area 304. For example, if a merchant location 302 tends to have a greater amount of traffic or has a large parking lot that customers 108 need to navigate through to reach the item pick-up area 304, the distance threshold 306 may be smaller. The distance threshold 306 may be decreased in order to avoid detecting stop events 216 that correspond to the customer 108 stopping at traffic lights/signals near the merchant location 302, the customer 108 waiting in a congested parking lot, or the customer 108 waiting for pedestrians in the parking lot. As additional data relating to stop events 216 at or near the merchant location 302 is obtained and analyzed, and the accuracy of detecting stop events 216 is increased, the service provider 102 may decrease the distance threshold 306 for a merchant location 302.

In some embodiments, the service provider 102 may not determine or generate stop events 216 when the customer 108 is at a distance that is greater than the distance threshold 306 from the merchant location 302. That is, if the customer 108 is outside of the distance threshold 306, the service provider 102 may simply refrain from generating or determining stop events 216. However, when it is determined that a location of the customer 108 is less than, or within, the threshold distance 306 from the merchant location 302, the service provider 102 may begin determining or generating stop events 216 of the customer 108. Refraining from determining stop events 216 of the customer 108 when the customer 108 is outside the distance threshold 306 is likely to reduce battery usage of the customer device 110 and is also likely to reduce processing power of the content server(s) 114.

As described herein, the service provider 102 may receive a customer interaction indication 128, which may indicate that the customer 108 has been greeted or otherwise interacted with at the merchant location 302. For instance, an associate at the merchant location 302 may locate the customer 108 and input that information via a merchant device 106, which may then transmit the customer interaction indication 128 to the content server(s) 114. As a result, the service provider 102 may be aware of a customer interaction time 130, which is a confirmed time that the customer 108 was greeted by the associate. From the customer interaction time 130, the service provider 102 may identify the most recent stop event 216. Here, the most recent stop event 216 is the third stop event 318, which indicates a time and location at which the customer 108 most recently stopped. FIG. 3 illustrates that the third stop event 318 corresponds to the customer 108 stopping the item pick-up location 312 within the item pick-up area 304. The service provider 102 may determine that the third stop event 318 is the arrival stop event 218. An estimated customer arrival time 134 may be associated with the arrival stop event 218, and that time may correspond to a time at which the customer 108 arrived at the merchant location 302 or, more specifically, the item pick-up area 304. The wait time of the 138 of the customer 108 may be determined based on a difference between the customer interaction time 130 and the customer arrival time 134. This wait time 138 may correspond to amount of time since the customer 108 arrived at the merchant location 302 until the customer 108 was greeted at the merchant location 302.

The previous stop events 216 of the customer 108 may correspond to other instances in which the customer 108 stopped while in transit to the merchant location 302, but not an instance in which the customer 108 actually arrived at the merchant location 302. For instance, the first stop event 314 may correspond to the customer 108 stopping to allow a pedestrian to cross the street and the second stop event 316 may correspond to the customer 108 stopping at a traffic light/signal. As these stop events 216 do not indicate that the customer 108 has arrived at the merchant location 302, the first stop event 314 and the second stop event 316 will not constitute the arrival stop event 218. In various embodiments, the customer device 110 and/or the service provider 102 may only determine, based on the sensor data 126, that the customer 108 has stopped (e.g., the first stop event 314, the second stop event 316, and the third stop event 318). That is, the customer device 110 and/or the service provider 102 may not know why the customer 108 has stopped, but just that the customer 108 has stopped. As additional stop event data 132 for different customers 108 is obtained, the service provider 102 may determine what the stop events 216 correspond to, such as a traffic signal/light, a crosswalk, arrival at the item pick-up area 304 of the merchant location 302, and so on.

Figure 4:
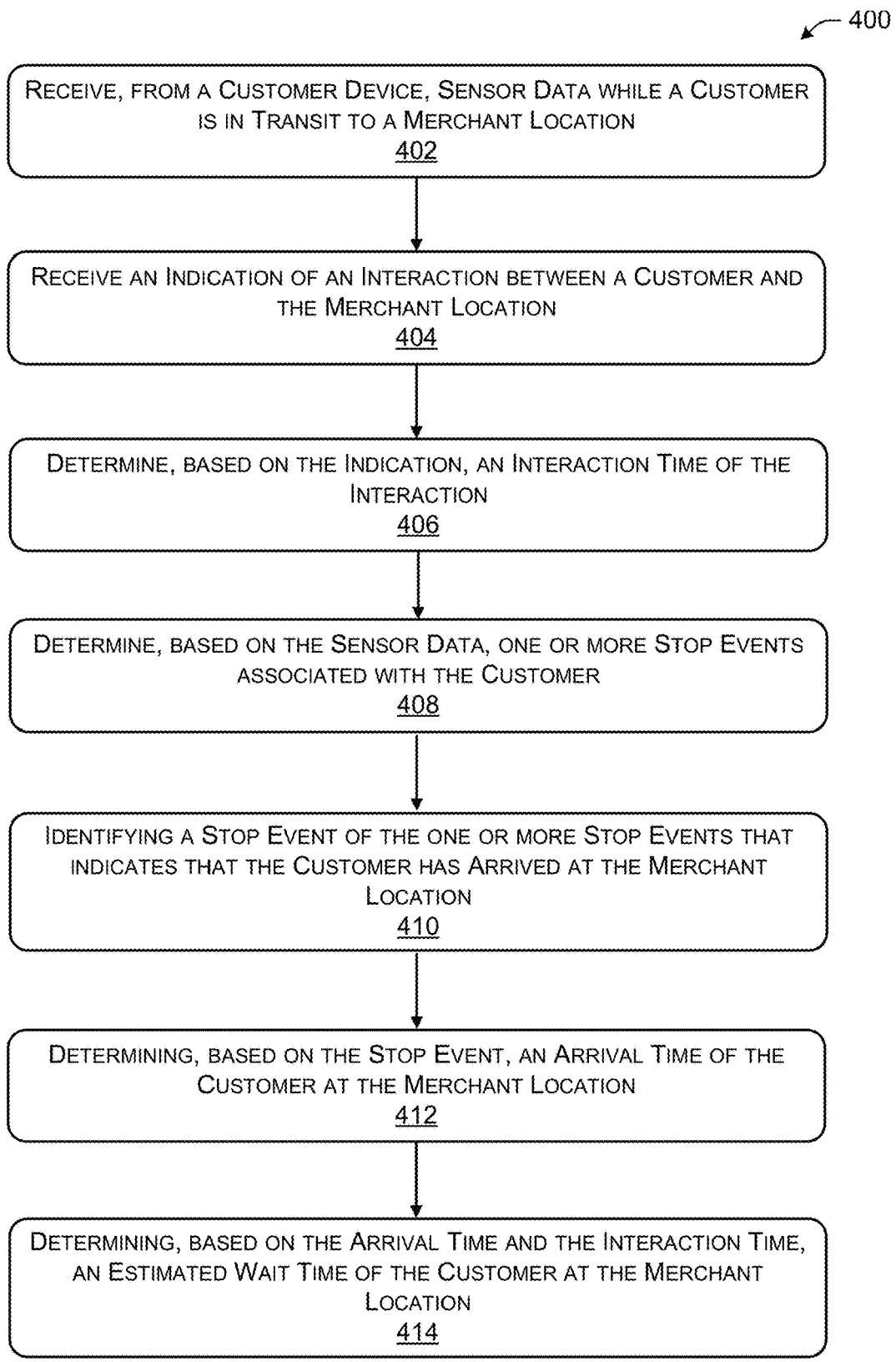
FIG. 4 is a flow diagram illustrating an example process of estimating a wait time of a customer at a merchant location based on sensor data obtained by a customer device of the customer.
Figure 5:
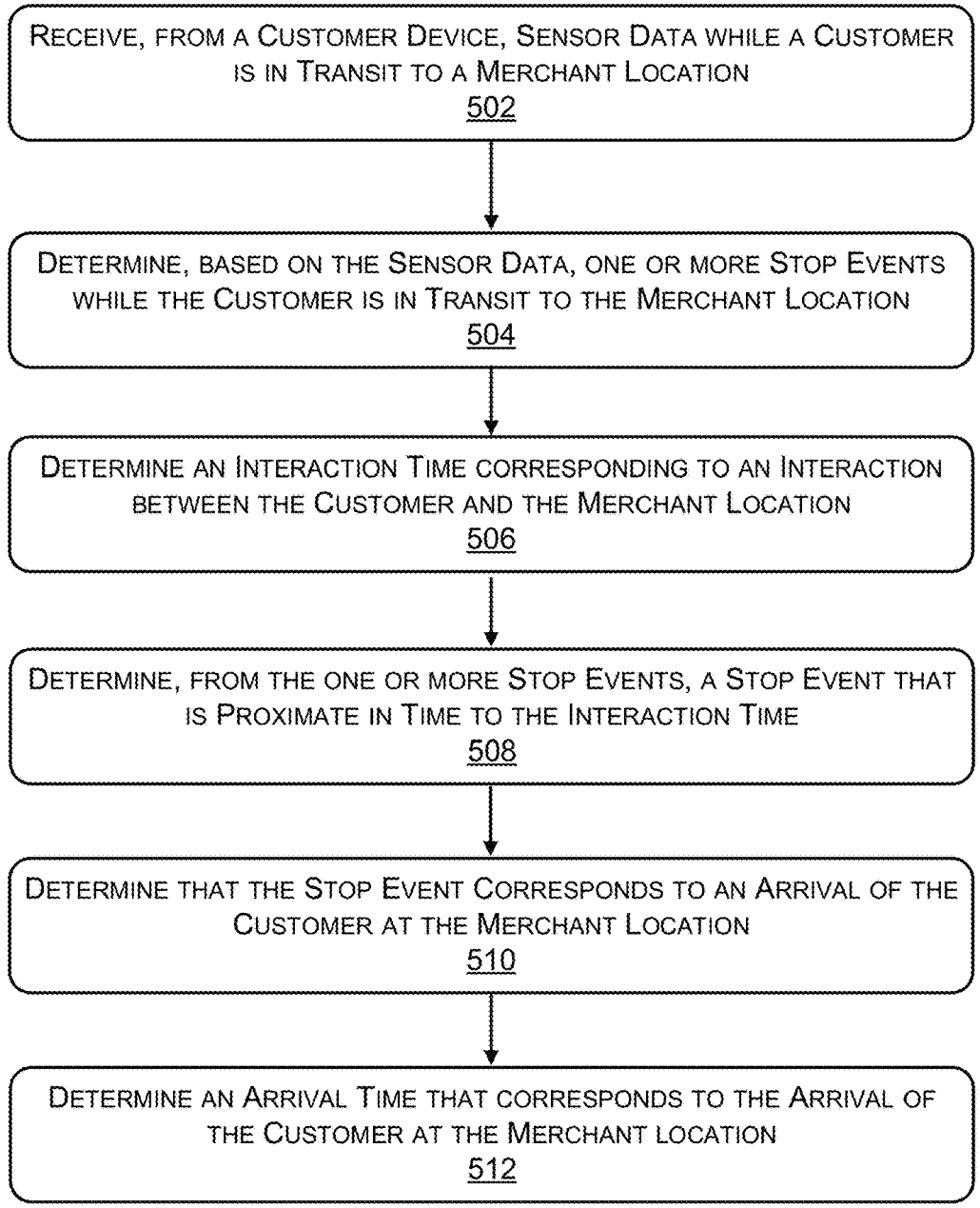
FIG. 5 is a flow diagram illustrating an example process of determining an arrival time of customer at a merchant location based on stop events determined from sensor data obtained by a customer device of the customer.
Figure 6:
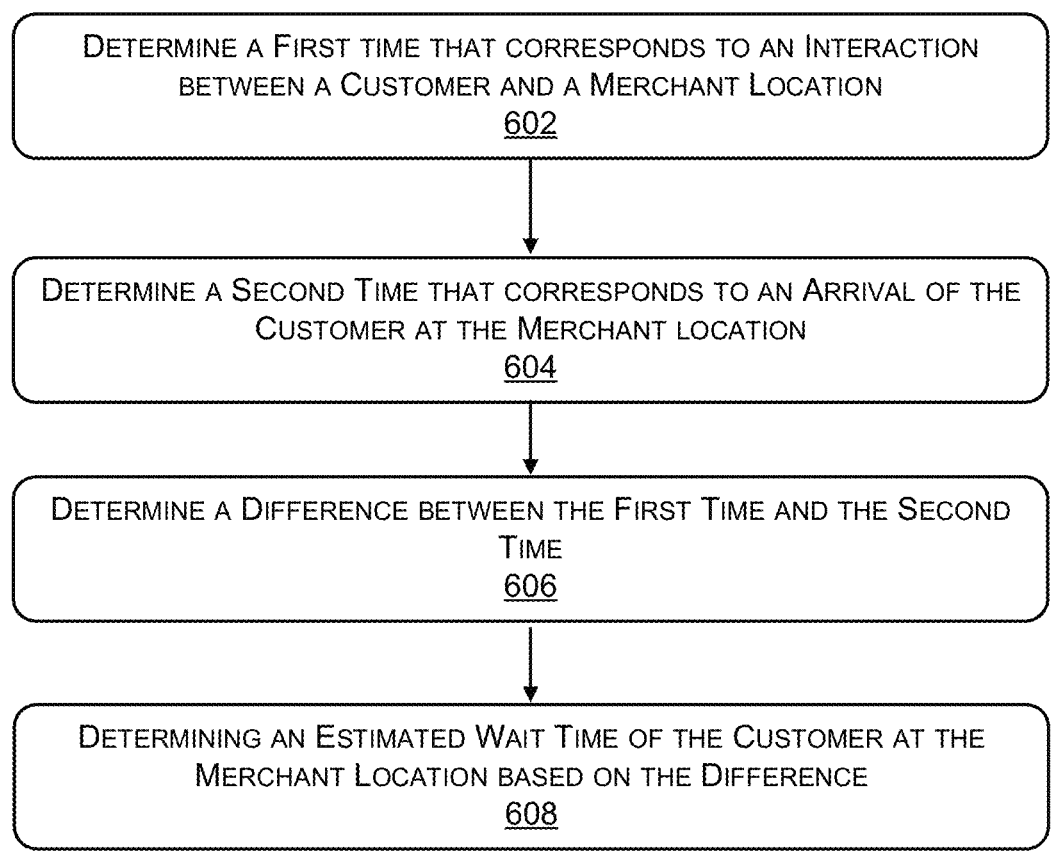
FIG. 6 is a flow diagram illustrating an example process of determining an estimated wait time of a customer at a merchant location based on a difference between an arrival time of the customer and an interaction time of the customer with respect to the merchant location.

FIGS. 4-6 illustrate example processes of estimating a wait time of a customer at a merchant location based on sensor data obtained by a customer device of the customer while the customer is in transit to the merchant location. These processes (as well as each process described herein) are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 4 illustrates a flow diagram of an example process 400 of estimating a wait time of a customer at a merchant location based on sensor data obtained by a customer device of the customer while the customer is in transit to the merchant location. Moreover, the following actions described with respect to FIG. 4 may be performed by the service provider 102 and/or the content server(s) 114, as illustrated with respect to FIGS. 1-3.

Block 402 illustrates receiving, from a customer device, sensor data while a customer is in transit to a merchant location. While the customer 108 is in transit to the merchant location to pick up one or more items 116 from the merchant location, one or more sensors of the customer device 110 of the customer 108 may obtain or collect sensor data 126, which may include location data (e.g., GPS data), velocity data, acceleration data, and so on. The sensor data 126 may be transmitted from the customer device 110 to the content server(s) 114. In additional embodiments, the customer device 110 may generate the stop event data 132 based on the sensor data 126 and then send the stop event data 132 to the content server(s) 114.

Block 404 illustrates receiving an indication of an interaction between a customer and the merchant location. After the customer 108 arrives at the merchant location, the customer 108 may be greeted or otherwise interacted with by an individual/associate of the merchant location. For instance, the customer 108 may locate the customer 108, verify an identity of the customer 108, and identify the items 116 to be picked up by the customer 108. The individual/associate may enter such information via a merchant device 106, and a customer interaction indication 128 may be sent to the content server(s) 114. The customer interaction indication 128 may indicate to the service provider 102 that the customer 108 has in fact arrived at the merchant location. In some embodiments, the customer 108 may remain in his/her vehicle while at the merchant location.

Block 406 illustrates determining, based on the indication, an interaction time of the interaction. The customer interaction indication 128 may be accompanied with a timestamp that records when the data was inputted into the merchant device 106 and/or when the customer interaction indication 128 was transmitted from the customer device 110 to the content server(s) 114. The customer interaction time 130 may represent this time.

Block 408 illustrates determining, based on the sensor data, one or more stop events associated with the customer. Based on the sensor data 126, the service provider 102 may identity instances in which the customer 108 stopped while in transit to the merchant location, such as the customer 108 being stationary for a threshold amount of time. The stop events 216 may correspond to the customer 108 stopping at a traffic signal/light, stopping in traffic, waiting for a pedestrian to cross the street, stopping at a different merchant 104 or merchant location, and/or arriving at the merchant location. In other embodiments, instead of the service provider 102 determining the stop events 216, the stop events 216, or data representative thereof (e.g., the stop event data 132), may be received directly from the customer device 110.

Block 410 illustrates identifying a stop event of the one or more stop events that indicates that the customer has arrived at the merchant location. From the stop events 216, the service provider 102 may identify an arrival stop event 218 that indicates that the customer 108 has stopped/parked at the merchant location. The arrival stop event 218 may be determined by identifying the most recent stop event 216 from the customer interaction time 130. That is, from the confirmed time that the customer 108 was actually located at the merchant location, the service provider 102 may identify the most recent and proximate time that the customer 108 stopped. The most recent stop event 216 (e.g., the arrival stop event 218) may indicate that the customer 108 has stopped within the item pick-up area 304 at the merchant location.

Block 412 illustrates determining, based on the stop event, an arrival time of the customer at the merchant location. Since time/timestamp data may accompany the sensor data 126, the service provider 102 may determine a time corresponding to the arrival stop event 218 (e.g., the estimated customer arrival time 134).

Block 414 illustrates determining, based on the arrival time and the interaction time, an estimated wait time of the customer at the merchant location. The service provider 102 may determine a wait time 138 of the customer 108 based on a difference between the customer interaction time 130 and the estimated customer arrival time 134. This amount of time may represent an amount of time since the customer 108 arrived at the merchant location to when the customer 108 was greeted or otherwise interacted with an associate/individual at the merchant location.

FIG. 5 illustrates a flow diagram of an example process 500 of determine an arrival time of a customer at a merchant location based on one or more stop events associated with the customer. Moreover, the following actions described with respect to FIG. 5 may be performed by the service provider 102 and/or the content server(s) 114, as illustrated with respect to FIGS. 1-3.

Block 502 illustrates receiving, from a customer device, sensor data while a customer is in transit to a merchant location. In some embodiments, while the customer 108 is in transit to the merchant location to pick up one or more items 116 from the merchant location, one or more sensors of the customer device 110 of the customer 108 may obtain or collect sensor data 126, which may include location data (e.g., GPS data), velocity data, acceleration data, and so on. The sensor data 126 may be transmitted from the customer device 110 to the content server(s) 114

Block 504 illustrates determining, based on the sensor data, one or more stop events while the customer is in transit to the merchant location. Based on the sensor data 126, the service provider 102 may identity instances in which the customer 108 stopped while in transit to the merchant location, such as the customer 108 being stationary for a threshold amount of time. The stop events 216 may correspond to the customer 108 stopping at a traffic signal/light, stopping in traffic, waiting for a pedestrian to cross the street, stopping at a different merchant 104 or merchant location, and/or arriving at the merchant location.

Block 506 illustrates determining an interaction time corresponding to an interaction between the customer and the merchant location. After arriving at the merchant location, the customer 108 may be greeted by an associate/ individual at the merchant location, or the customer 108 may otherwise check in via a self-service merchant device 106 at the merchant location or via their customer device 110. This interaction between the customer 108 and the merchant location may have a corresponding timestamp. The customer interaction time 130 may be transmitted from the merchant device 106 to the content server(s) 114 and may be maintained by the service provider 102 in association with the customer 108, or a customer profile/account associated therewith.

Block 508 illustrates determining, from the one or more stop events, a stop event that is proximate in time to the interaction time. Upon determining a customer interaction time 130 that confirms that the customer 108 is/was physically located at the merchant location, the service provider 102 may identify the most recent stop event 216 prior to the customer interaction time 130. This stop event 216 may constitute the arrival stop event 218, and may represent the customer 108 stopping at the merchant location, such as within an area that is designated for customers 108 to pick up items 116 at the merchant location.

Block 510 illustrates determining that the stop event corresponds to an arrival of the customer at the merchant location. Based on the sensor data 126 and possibly historical data regarding the merchant location, the service provider 102 may determine that the identified stop event 216 (e.g., the arrival stop event 218), corresponds to the customer 108 arriving at an area at the merchant location that is designated for the pick-up of items 116 my customers 108.

Block 512 illustrates determining an arrival time that corresponds to the arrival of the customer at the merchant location. Since the sensor data 126 is timestamped, and because the stop events 216 are identified based on the sensor data 126, the service provider 102 may identify a time associated with the stop event 216 (e.g., the estimated customer arrival time 134). The arrival time 134 of the customer 108 is an estimated time that the customer 108 arrived at the merchant location.

FIG. 6 illustrates a flow diagram of an example process 600 of determining an estimated wait time of a customer at a merchant location. Moreover, the following actions described with respect to FIG. 6 may be performed by the service provider 102 and/or the content server(s) 114, as illustrated with respect to FIGS. 1-3.

Block 602 illustrates determining a first time that corresponds to an interaction between a customer and a merchant location. In various embodiments, the service provider 102 may receive a customer interaction indication 128 from a merchant device 106 at the merchant location, which indicates a time (e.g., a customer interaction time 130) at which the customer 108 was greeted or interacted with by an associate or individual at the merchant location.

Block 604 illustrates determining a second time that corresponds to an arrival of the customer at the merchant location. Based on a determination of an arrival stop event 218 of the customer 108 at the merchant location, the service provider 102 may determine a time (e.g., an estimated customer arrival time 134) at which the customer 108 actually arrived at the merchant location.

Block 606 illustrates determining a difference between the first time and the second time. Since the estimated customer arrival time 134 will be prior to the customer interaction time 130, there will be a difference between these two times. In some instances, the difference will be very small (e.g., seconds) since an associate at the merchant location may greet the customer 108 as soon as he/she arrives.

Block 608 illustrates determining an estimated wait time of the customer at the merchant location based on the difference. The estimated wait time 138 of the customer 108 may constitute the difference. Accordingly, the estimated wait time 138 may begin when the customer 108 arrives at the merchant location, such as the customer 108 parking at an area/spot designated for item pick-up 124, and may end when the customer 108 is greeted or otherwise interacted with by an associate at the merchant location. In some instances, the later time may also correspond to when the customer 108 checked in with the merchant location via a merchant device 106 or a customer device 110.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more processors;
memory; and
one or more computer-executable instructions stored in the memory and executable by the one or more processors to perform operations comprising:
receiving, via a mobile application that resides on a first device of a customer and that is associated with a service provider, an order for one or more food items, the order identifying a physical store location at which the customer is to pick up the one or more food items;
receiving, from the first device and while the customer is in transit to the physical store location, sensor data, the sensor data being obtained by one or more sensors of the first device and including at least one of location data, velocity data, or acceleration data;
receiving, from a second device associated with the physical store location, an indication that the customer was located at the physical store location and a first time that corresponds to the indication;
determining, based on the sensor data, multiple stop events while the customer is in transit to the physical store location, each stop event of the multiple stop events indicating a location and a time at which the first device moved less than a threshold amount for a predetermined amount of time;
identifying, from the multiple stop events, a stop event representative of an arrival of the customer at a designated item pick-up area at the physical store location, the stop event being most proximate in time to the first time as compared to other stop events of the multiple stop events;
determining a second time associated with the stop event; and
estimating a wait time of the customer between the arrival of the customer at the physical store location and the indication by determining a difference between the first time and the second time.

2. The system as recited in claim 1, wherein the operations further comprise:
determining a predetermined distance that extends from and surrounds the physical store location;
determining that a location associated with the stop event is equal to or less than the predetermined distance from the physical store location; and identifying the stop event based on the location associated with the stop event being equal to or less than the predetermined distance.

3. The system as recited in claim 1, wherein the operations further comprise determining an average wait time for customers at the physical store location based on the wait time and other wait times previously determined for other customers that picked up food items from the physical store location.

4. The system as recited in claim 1, wherein the operations further comprise:
determining an estimated time of arrival (ETA) of the customer with respect to the physical store location;
determining, based on the ETA, that an estimated amount of travel time from a current location of the customer to the physical store location is equal to or less than a threshold amount of time; and
identifying the stop event based on the estimated amount of travel time being equal to or less than the threshold amount of time.

5. A method comprising:
determining one or more stop events associated with a first device of a customer that is in transit to a physical location, the one or more stop events being based at least in part on sensor data obtained by the first device;
determining, based at least in part on an indication received from a second device associated with the physical location, a first time at which the customer was located at the physical location;
determining, from the one or more stop events, a stop event that corresponds to an arrival of the customer at the physical location; and
determining a wait time of the customer at the physical location based at least in part on the first time and a second time associated with the stop event.

6. The method as recited in claim 5, wherein determining the stop event comprises determining that the stop event is most proximate in time to the first time as compared to other stop events of the one or more stop events.

7. The method as recited in claim 5, wherein determining the one or more stop events comprises determining that at least one of a velocity or an acceleration of the first device was less than a threshold amount for a predetermined amount of time.

8. The method as recited in claim 5, further comprising:
receiving, from the first device, an indication that the customer is initiating travel to the physical location to pick up one or more items; and
receiving, from the first device and in response to receiving the indication, the sensor data, the sensor data including at least one of location data, velocity data, or acceleration data of the first device.

9. The method as recited in claim 5, further comprising sending, to the second device or a third device associated with the physical location, a notification that indicates the wait time of the customer at the physical location.

10. The method as recited in claim 5, further comprising:
determining a predetermined distance that extends from the physical location;
determining that a location associated with the stop event is equal to or less than the predetermined distance; and
identifying the stop event based at least in part on the location being equal to or less than the predetermined distance.

11. The method as recited in claim 5, wherein determining the one or more stop events comprises determining that a change in location of the first device was less than a threshold amount for a predetermined amount of time.

12. The method as recited in claim 5, further comprising identifying the stop event by:
receiving multiple sensor data points over a period of time;
determining a number of the sensor data points that indicate that the first device is moving less than a threshold amount; and
determining that the number is equal to or greater than threshold value.

13. The method as recited in claim 5, further comprising:
identifying historical data that indicates stop events for other customers that traveled to the physical location; and
determining that the stop event corresponds to the arrival of the customer at the physical location based at least in part on the historical data.

14. The method as recited in claim 5, further comprising:
determining a predetermined distance that extends from the physical location;
determining that a location associated with a second stop event of the one or more stop events is greater than the predetermined distance; and
disregarding the second stop event based at least in part on the location being greater than the predetermined distance.

15. A method comprising:
determining one or more stop events associated with a first device of a customer that is in transit to a physical location, the one or more stop events being based at least in part on sensor data obtained by the first device;
determining, based at least in part on an indication received from a second device associated with the physical location, a first time at which the customer was located at the physical location;
determining that a stop event of the one or more stop events is most proximate in time to the first time; and
determining that the stop event corresponds to an arrival of the customer at the physical location.

16. The method as recited in claim 15, further comprising determining a wait time of the customer at the physical location based at least in part on the first time and a second time associated with the stop event.

17. The method as recited in claim 16, further comprising at least one of:
sending, to the second device, a notification indicating the wait time;
determining an average wait time based at least in part on the wait time and previous wait times of other customers at the physical location; or
sending, to the first device, an option to refund an order for one or more items for pick-up at the physical location.

18. The method as recited in claim 15, further comprising receiving, from the first device, the sensor data, the sensor data including at least one of location data, velocity data, or acceleration data of the first device.

19. The method as recited in claim 15, wherein determining the one or more stop events comprises determining that at least one of a velocity or an acceleration of the first device was less than a threshold amount for a predetermined amount of time.

20. The method as recited in claim 15, wherein determining the one or more stop events comprises determining that a change in location of the first device was less than a threshold amount for a predetermined amount of time.

\* \* \* \* \*